United States Patent [19]

Witzigman

[11] Patent Number: 4,869,629

[45] Date of Patent: Sep. 26, 1989

[54] BLIND FASTENER

[75] Inventor: James W. Witzigman, Sparta, Tenn.

[73] Assignee: Textron Inc., Providence, R.I.

[21] Appl. No.: 222,946

[22] Filed: Jul. 22, 1988

[51] Int. Cl.⁴ .................... F16B 13/04; F16B 13/06
[52] U.S. Cl. .................................. 411/38; 411/55;
411/183
[58] Field of Search .................... 411/34–38,
411/42, 43, 55, 70, 183

[56] References Cited

U.S. PATENT DOCUMENTS

| | | | |
|---|---|---|---|
| 1,224,926 | 5/1917 | Hindmarsh | 411/38 |
| 2,148,977 | 2/1939 | Buck. | |
| 3,667,340 | 6/1972 | Black et al. | 83/71 |
| 3,789,728 | 2/1974 | Shackelford | 411/34 |
| 4,309,136 | 1/1982 | Talan | 411/34 |
| 4,416,572 | 11/1983 | Black | 411/38 |
| 4,580,936 | 4/1986 | Francis et al. | 411/38 |
| 4,642,009 | 2/1987 | Fischer | 411/38 |

FOREIGN PATENT DOCUMENTS 670048  10/1964  Italy ...................................... 411/173

*Primary Examiner*—Neill R. Wilson
*Attorney, Agent, or Firm*—Webb, Burden, Ziesenheim & Webb

[57] ABSTRACT

A collapsible fastener and method of making same for joining workpieces which fastener can be fabricated with a single machining operation aside from thread tapping. The fastener comprises a forged sleeve defined by cylindrical exterior and interior surfaces. The sleeve has a head at one end for bearing against one surface of the workpieces, internally threaded tail, and a shank extending between the head and the tail. A plurality of extruded grooves on the exterior surface of the shank are parallel to the axis of the sleeve. An extruded notch in each groove is at substantially the same distance from the head. When a mandrel is extended through the head and the shank and is threaded into the tail, by turning the mandrel the tail may be drawn toward the head whereby the shank splits into strips which fold at the notches.

7 Claims, 2 Drawing Sheets

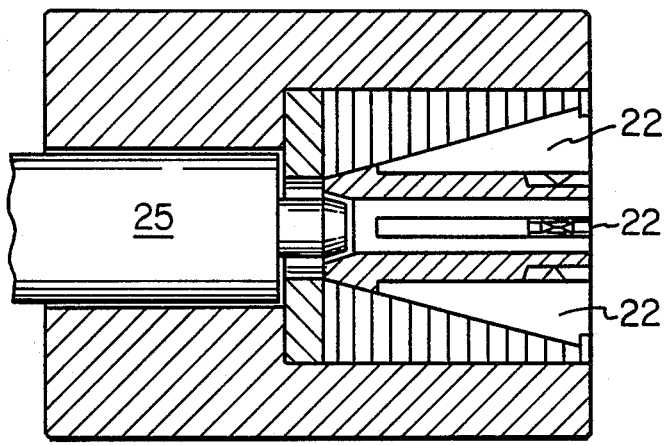
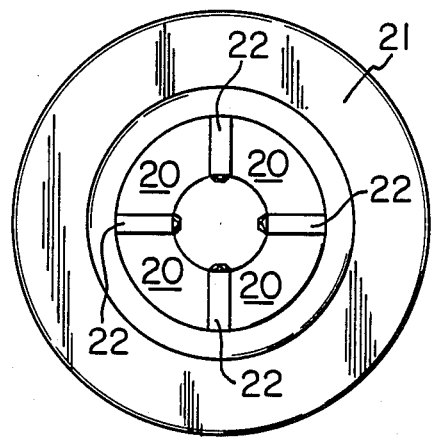
Fig. 7      Fig. 8
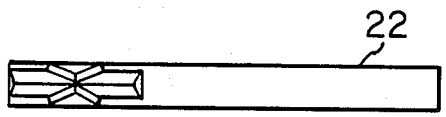
Fig. 9
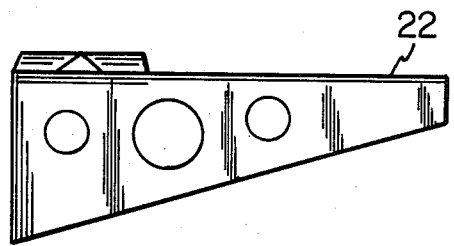
Fig. 10
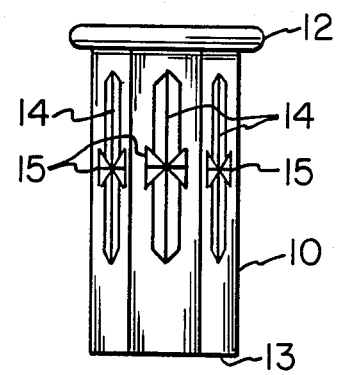
Fig. 11

4,869,629

BLIND FASTENER

BACKGROUND OF THE INVENTION

This invention relates to collapsible fasteners, sometimes called one-piece blind fasteners, of a kind which serve as a nut plate. These fasteners have a head to bear against the exposed face of a structural member (workpiece) having a hole. These fasteners also have an expandable shank portion which bears against the blind (inaccessible) face of the structural member. The expandable shank or body has at least two slots to enable the fastener to split into pedals upon setting and some means of controlling the location where the pedals fold.

Buck U.S. Pat. No. 2,148,977 relates to a blind fastener of the general type collapsible fasteners but not apparently to those for use in heavy duty applications and not to be used as nut plates. The shank of the hollow plug in this prior art device is provided with slots cut clear through and with clear through holes cut in the center of the slots to control the location of folding. This technique may be suitable for light-weight blind fasteners but would be difficult and expensive to use with heavy duty fasteners.

Black et al. U.S. Pat. No. 3,667,340 is directed to what appears to be a heavy duty blind fastener. The fastener is fabricated by a series of extrusion steps. After the bore is punched out of the shank, a mandrel is inserted in the bore so that knives can cut slots in the shank without crushing it. Finally, a notching tool is inserted within the bore to cut a circumferential groove on the interior of the bore to control the location of folding. Black U.S. Pat. No. 4,416,572 teaches the same means of controlling the location of the fold.

Shackelford U.S. Pat. No. 3,789,728 teaches a heavy duty blind fastener in which multiple diameter bores are used to control the location of fold.

It is an advantage according to this invention to provide a fastener and a method of making it that does not require more than one machining step aside from tapping of threads. It is a further object to provide a novel means of controlling the location of the fold in the pedals upon setting.

SUMMARY OF THE INVENTION

Briefly, according to this invention, there is provided a collapsible fastener for joining workpieces. The fastener can be fabricated with a single machining operation aside from thread tapping. The fastener comprises a forged sleeve defined by cylindrical exterior and interior surfaces. The sleeve has a head at one end for bearing against one surface of the workpieces, an internally threaded tail, and a shank extending between the head and the tail. A plurality of extruded grooves are provided on the exterior surface of the shank parallel to the axis to the sleeve. An extruded notch is provided in each groove at substantially the same distance from the head. Thus, when a bolt or the threaded mandrel of a setting tool is extended through the head and the sleeve and is threaded into the tail, the tail may be pulled toward the head whereby the shank splits into strips or pedals which fold at the notches.

Preferably, the exterior surface of the sleeve is circular cylindrical and the extruded grooves define a v-shaped indentation. In one embodiment of the collapsible fastener, the v-shaped indentation extends to the interior surface of the sleeve. Preferably, the notches in each groove define a v-shaped indentation extending across the groove. In one embodiment of the collapsible fastener, the thickness of the sleeve is at least 0.020 inches. Suitable materials for the fastener include low carbon steel, stainless steel or aluminum.

There is also provided, according to this invention, a method of forming a robust collapsible fastener in which the sleeve is forged and there is used only a single machining operation aside from thread tapping. The method comprises a plurality of forging or extruding steps followed by a machining step. First, a metal blank having an exterior cylindrical surface and an elongate axis is formed. Next, a head is forged on the blank. Then a hole into one end of the blank formed by backwards extrusion and a hole into the other end of the blank is formed by backwards extrusion but not so as to connect with the hole formed at the other end. Now, a plurality of grooves are extruded on the exterior surface of the blank without placing a mandrel into either extruded hole. The grooves are parallel to the elongate axis of the blank. At the same time the grooves are extruded, a notch is extruded in each groove, all notches being substantially the same distance from the head. Finally, the head end of the blank is drilled to remove the metal between the two holes and to establish the thickness of the sleeve and an interior cylindrical surface. Internal threads are tapped in the fastener at the end opposite the head.

DESCRIPTION OF THE DRAWINGS

Further features and other objects and advantages of this invention will become clear from the following detailed description made with reference to the drawings in which:

FIG. 7 is a section through a die for extruding the grooves on the outer cylindrical surface of the fasteners;

FIG. 8 is an end view of the die shown in section in FIG. 7;

FIG. 9 is a side view of a knife being one part of the die shown in section in FIG. 7;

FIG. 10 is a top view of the knife shown in FIG. 9; and

FIG. 11 is a side view of the fastener according to this invention in which the sleeve has a plurality of planar exterior surfaces.

DESCRIPTION OF THE PREFERRED EMBODIMENT

Figure 1A:
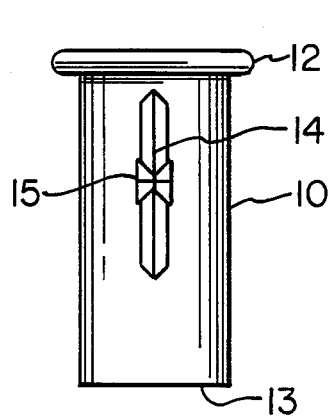
FIG. 1A is a side view of the fastener according to this invention and FIG. 1B is the same view shown in section.
Figure 1B:
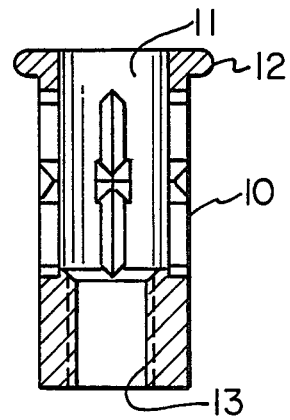
Figure 2:
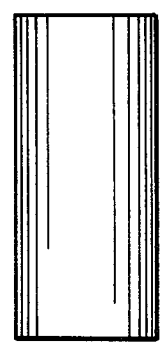
FIGS. 2 to 6 are side views of the fastener according to this invention in various stages of production.
Figure 3:
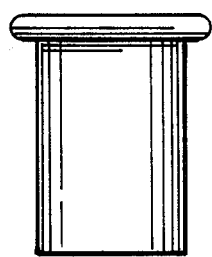
Figure 4:
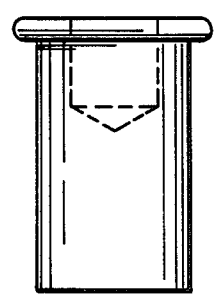

Referring now to FIGS. 1A and 1B, there is shown a blind fastener according to a preferred embodiment of this invention. The fastener 10 comprises a hollow shank 11, a head 12 and a threaded tail 13. Extruded on the outer cylindrical surface of the shank 11 are a plurality of v-shaped grooves 14. The grooves are parallel to the cylindrical axis of the outer cylindrical surface. Midway between the ends of the grooves are extruded v-shaped notches 15 generally perpendicular to the grooves. It is not necessary that the grooves and notches be v-shaped but this has been found very satisfactory. Perhaps surprisingly, it has been found that the v-shaped notches need not be any wider or just barely wider than the grooves at the outer cylindrical surface of the sleeve. It is not necessary that the grooves and notches extend entirely through the wall of the sleeve, however, this also has been found very satisfactory.

When the fastener as described in the preceding paragraph is inserted through a hole in the workpiece and a mandrel is turned into the threads in the tail, the shank splits into pedals that fold at the location of the notches. The pedals draw up along the blind side of the workpiece to hold the fastener in place. The fastener may secure multiple workpieces together or simply provide a fixed nut plate. It has been found that the thickness of the workpiece or pieces into which the fastener 10 is inserted does not have a critical effect on the gripping action of the fastener. Indeed, the workpiece may actually extend away from the head along the shank to the extent that the workpiece covers a portion of the grooves. In any event described in this paragraph, the pedals will form and uniformly fold. It should be apparent that the pedals will have a substantially uniform width and thickness from one end to the other which distinguishes the fasteners according to this invention from the prior art fasteners noted above. This feature should provide the fastener with increased gripping strength when installed.

Figure 5:
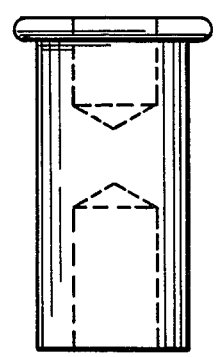
Figure 6:
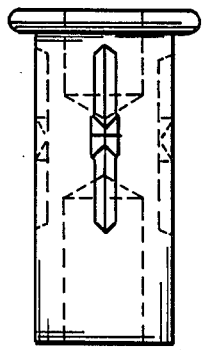

An advantage of the fastener 10 is that it can be fabricated on a heading machine having a plurality of forging stations followed by only one machining step aside from thread tapping. FIGS. 2 to 6 illustrate the various stages of production of the fastener. A precut blank is first squared (see FIG. 2) and then headed (see FIG. 3). Holes are backward extruded into each end (see FIGS. 4 and 5). The hole in the tail end has a diameter corresponding to the inner diameter of the threads to be later tapped therein. The hole in the head end need not have a diameter defining the inner surface of the shank. A plug is left between the two holes extruded from the opposite ends of the fastener. This plug serves an important function in the next step. At this time, the grooves 14 and notches 15 are extruded into the cylindrical surface of the fasteners. The grooves and notches are extruded by inserting the fastener (as shown in FIG. 5) into a die as shown in FIGS. 7 and 8. The die supports the cylindrical surface of the unfinished fastener with four segment pieces 20 held in a die case 21. Four knives 22, as shown in more detail in FIGS. 9 and 10, slide radially between the four segment pieces. As the workpiece is forced into the die, the knives are forced radially inward extruding the grooves and notches. The incomplete fastener does not collapse inwardly since there is still a solid plug within the unfinished fastener.

The fastener (see FIG. 6) is then knocked out of the die by knockout pin 25. The fastener is removed from the heading machine and drilled and tapped as would be most any blind fastener of this type. The drill bit is inserted from the head end of the fastener to remove the plug remaining after the two backward extrusion steps. It may also establish the inner diameter of the shank.

Having thus defined my invention with the detail and particularity as required by the Patent Statutes, what is desired protected by Letters Patent is set forth in the following claims.

I claim:

1. A collapsible fastener for joining workpieces which fastener can be fabricated with a single machining operation aside from thread tapping, comprising: a forged sleeve defined by cylindrical exterior and interior surfaces, said sleeve having a head at one end for bearing against one surface of the workpieces, internally threaded tail, and a shank extending between the head and the tail, a plurality of extruded grooves on the exterior surface of the shank parallel to the axis of the sleeve, an extruded notch in each groove at substantially the same distance from the head, each said notch comprising an indentation from the exterior surface of the shank extending partially around the circumference of the shank across one of said grooves, whereby when a bolt is extended through the head and the shank and is threaded into the tail, by turning the bolt the tail may be drawn toward the head whereby the shank splits into strips which fold at the notches.

2. The collapsible fastener according to claim 1 in which the exterior surface of the shank is circular cylindrical.

3. The collapsible fastener according to claim 1 in which the sleeve has a plurality of planar exterior faces.

4. The collapsible fastener according to claim 1 wherein the extruded grooves define a v-shaped indentation.

5. The collapsible fastener according to claim 4 wherein the v-shaped indentation extends to the interior surface of the shank.

6. The collapsible fastener according to claim 1 wherein the thickness of the shank is at least 0.020 inches.

7. The collapsible fastener according to claim 1 wherein the shank is comprised of low carbon steel, stainless steel or aluminum.

* * * * *